United States Patent [19]

Watanabe et al.

[11] Patent Number: 4,477,374

[45] Date of Patent: Oct. 16, 1984

[54] TERNARY INTERCALATION COMPOUND OF A GRAPHITE WITH A METAL FLUORIDE AND FLUORINE, A PROCESS FOR PRODUCING THE SAME, AND AN ELECTRICALLY CONDUCTIVE MATERIAL COMPRISING THE TERNARY INTERCALATION COMPOUND

[75] Inventors: Nobuatsu Watanabe; Tsuyoshi Nakajima, both of Kyoto; Masayuki Kawaguchi, Wakayama, all of Japan

[73] Assignee: Central Glass Co., Ltd., Ube, Japan

[21] Appl. No.: 394,530

[22] Filed: Jul. 2, 1982

[30] Foreign Application Priority Data

Oct. 3, 1981 [JP] Japan ................................ 56-157807
Oct. 3, 1981 [JP] Japan ................................ 56-157808

[51] Int. Cl.³ ............................................. H01B 1/02
[52] U.S. Cl. ................................. 252/508; 252/509; 252/506; 260/665 G; 260/448 A
[58] Field of Search ............... 252/503, 506, 508, 509; 423/414, 448, 463, 464, 465, 593, 472; 260/429 K, 448 R, 448 A, 665 R, 665 G

[56] References Cited

U.S. PATENT DOCUMENTS 3,956,194  5/1976  Armand ............................. 252/507
4,119,655  10/1978  Hulme ............................. 260/429 R

OTHER PUBLICATIONS

H. Selig and L. B. Ebert, Adv. Inorg. Chem. Radiochem. 23, 281 (1980).

Primary Examiner—Josephine Barr
Attorney, Agent, or Firm—Armstrong, Nikaido, Marmelstein & Kubovcik

[57] ABSTRACT

A novel ternary intercalation compound of a graphite with a metal fluoride and fluorine, which is represented by the formula $C_xF(MF_z)_y$ wherein M is Al or Mg and z is an integer corresponding to the valence of M, is produced by contacting a graphite material with a metal fluoride selected from $AlF_3$ and $MgF_2$ in an atmosphere of fluorine gas at a temperature of 0° C. to 400° C. for at least a period of time to effect a weight increase in the graphite. The ternary graphite intercalation compound thus obtained has not only an excellent stability to humidity or moisture but also a high electrical conductivity. The novel ternary graphite intercalation compound according to the present invention may be practically used as a novel electrically conductive material and a catalyst of organic reactions.

11 Claims, 6 Drawing Figures

DIFFRACTION ANGLE, 2θ (°)

FIG 1
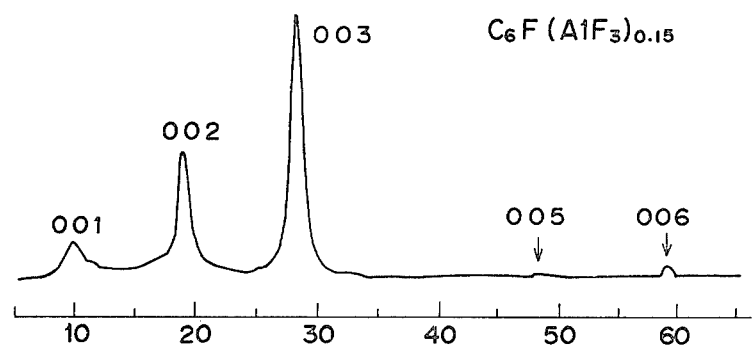
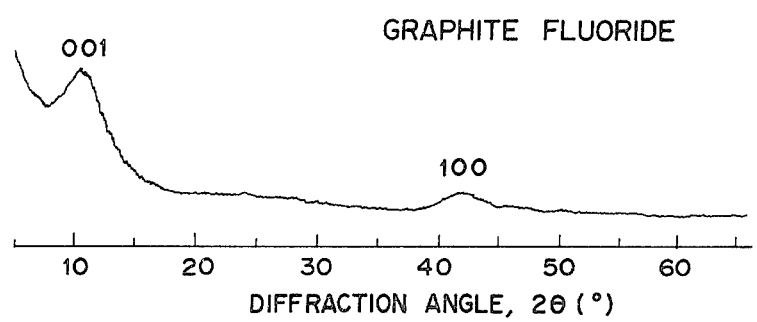
DIFFRACTION ANGLE, 2θ (°)

TERNARY INTERCALATION COMPOUND OF A GRAPHITE WITH A METAL FLUORIDE AND FLUORINE, A PROCESS FOR PRODUCING THE SAME, AND AN ELECTRICALLY CONDUCTIVE MATERIAL COMPRISING THE TERNARY INTERCALATION COMPOUND

This invention relates to a novel graphite intercalation compound. More particularly, the present invention is concerned with a ternary intercalation compound of a graphite with a metal fluoride and fluorine which is not only stable to humidity or moisture but also exhibits an excellent electrical conductivity. The present invention is also concerned with a process for producing a ternary intercalation compound of a graphite with a metal fluoride and fluorine. The present invention is further concerned with an electrically conductive material comprising the ternary intercalation compound of a graphite with a metal fluoride and fluorine.

In recent years, attention has increasingly been given to graphite intercalation compounds of fluorides because of their excellent electrical conductivities. However, most of conventionally known graphite intercalation compounds of fluorides are poor in stability to humidity or moisture so that they decompose immediately upon exposure to air and, hence, cannot be put to a practical use. The fluorides hitherto used as intercalants to be intercalated into graphite to form intercalation compounds therewith have low melting and boiling points, that is, they are gaseous or liquid at room temperature. Hence, it is generally accepted that a fluoride to be used as an intercalant should have a high vapor pressure at a relatively low temperature. Therefore, no attempt has been made to produce a graphite intercalation compound of a fluoride having a high melting or boiling point. In fact, it is impossible to prepare a binary intercalation compound of graphite with $AlF_3$ or $MgF_2$ which has no vapor pressure even at high temperatures.

We have made extensive and intensive investigations with a view to developing a practically useful graphite intercalation compound of a fluoride having not only an excellent electrical conductivity but also an excellent stability to humidity or moisture. As a result, it has been found that a ternary intercalation compound of a graphite with a metal fluoride and fluorine, which is represented by the formula $C_xF(MF_z)_y$ wherein M is Al or Mg and z is an integer corresponding to the valence of M, (hereinafter often referred to simply as "ternary graphite intercalation compound") can be obtained in a yield of 100% relative to the graphite material employed. The ternary graphite intercalation compound thus obtained is excellent in not only stability to humidity or moisture and heat resistance but also in electrical conductivity. The electrical conductivity of the present ternary graphite intercalation compound is higher than that of the raw graphite material employed by one cipher. The present invention has been made, based on such novel findings.

Accordingly, it is an object of the present invention to provide a novel ternary graphite intercalation compound which is excellent in not only stability to humidity or moisture and heat resistance but also in electrical conductivity.

It is another object of the present invention to provide a process for the production of such a novel ternary graphite intercalation compound.

It is still another object of the present invention to provide a novel electrically conductive material comprising a novel ternary graphite intercalation compound of the kind described above.

The foregoing and other objects, features and advantages of the present invention will be apparent to those skilled in the art from the following detailed description taken in connection with the accompanying drawings in which:

FIG. 1 shows an X-ray diffraction pattern of $C_6F(AlF_3)_{0.15}$ which is one form of the ternary graphite intercalation compounds according to the present invention, shown in comparison with that of a graphite fluoride;

Figure 5:
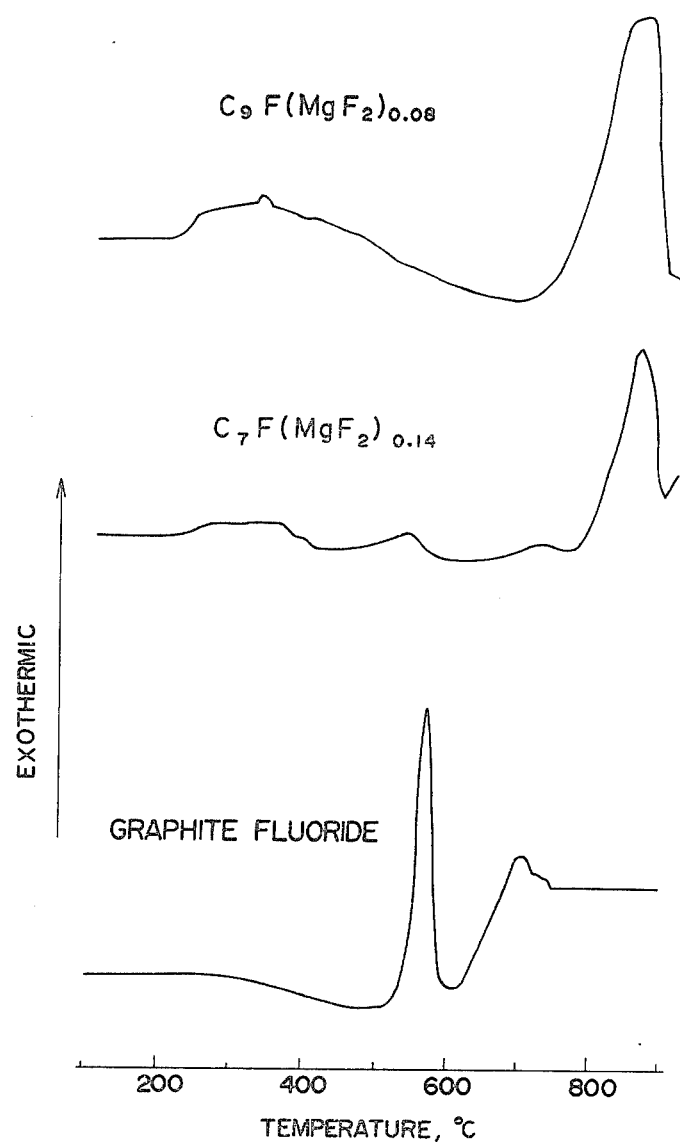
Figure 6:
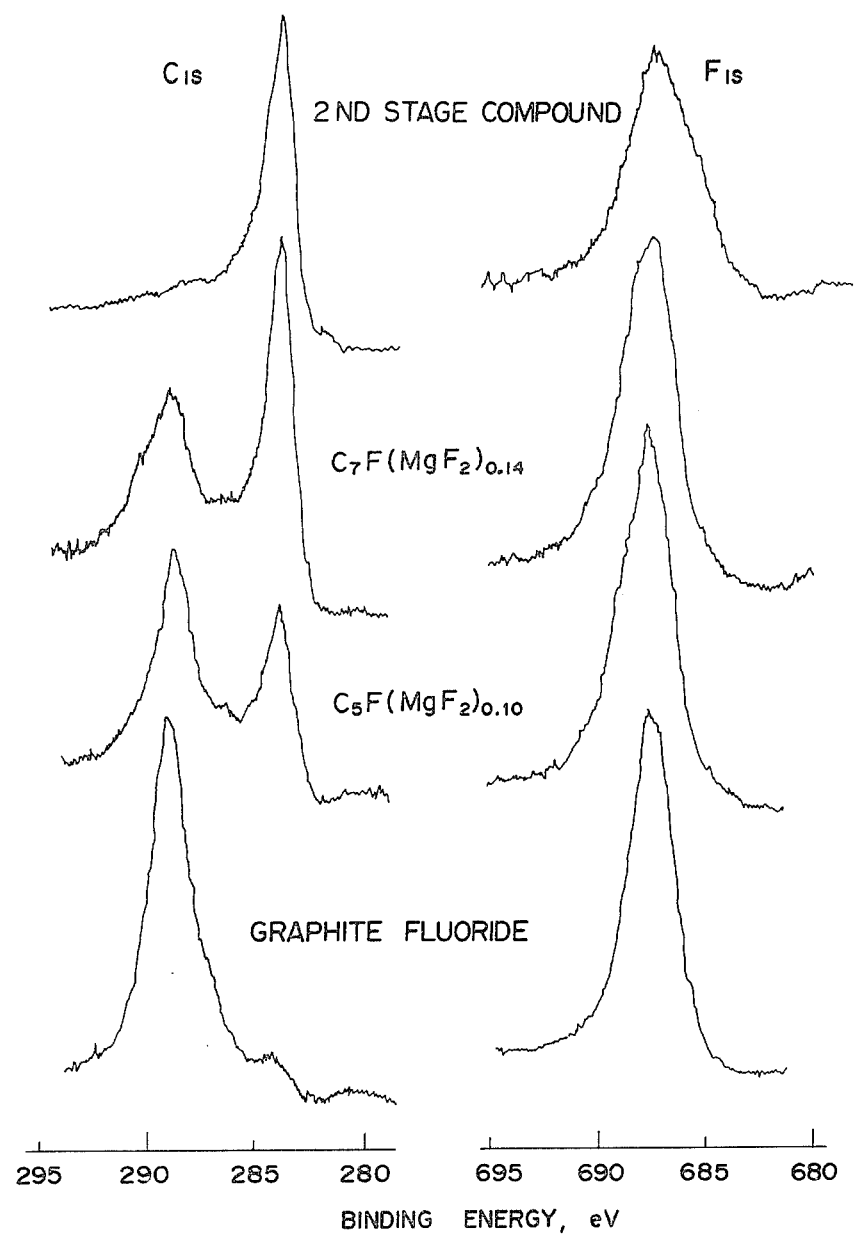

FIG. 5 shows DTA curves of $C_7F(MgF_2)_{0.14}$ and $C_9F(MgF_2)_{0.08}$ which are still further forms of ternary graphite intercalation compounds according to the present invention, shown in comparison with that of a graphite fluoride; and FIG. 6 shows ESCA spectra of 1st and 2nd compounds each containing $MgF_2$ as a metal fluoride according to the present invention, shown in comparison with that of a graphite fluoride According to one aspect of the present invention, there is provided a ternary intercalation compound of a graphite with a metal fluoride and fluorine represented by the formula $C_xF(MF_z)_y$ wherein M is Al or Mg and z is an integer corresponding to the valence of M.

In general, the ternary graphite intercalation compound represented by the formula $C_xF(MF_z)_y$ wherein M and z are as defined above can be produced by contacting a graphite material with a metal fluoride, namely $AlF_3$ or $MgF_2$, in an atmosphere of fluorine gas at a temperature of 0° C. to 400° C. for at least a period of time to effect a weight increase in the graphite.

The present invention will now be described in detail.

The ternary graphite intercalation compounds of the formula $C_xF(MF_z)_y$ according to the present invention include 1st stage, 2nd stage, 3rd stage, and sometimes 4th or higher stage compounds. The stage number of the ternary graphite intercalation compound can be determined by the measurement of the identity period (Ic) obtained by X-ray diffraction. The stage number of the formed ternary graphite intercalation compound depends not only on the reaction temperature and time, but also on the crystallinity and thickness (c-axis direction) of a graphite material. For the 1st stage compound, the value of x ranges from about 3.0 to 20 and the value of y ranges from about 0.03 to 0.20. For the 2nd stage compound, the value of x ranges from about 11 to 50 and the value of y ranges from about 0.01 to 0.15. For the 3rd or higher stage compound, the value of x is more than 30, the value of y ranges from $10^{-4}$ to $10^{-2}$. With respect to each of the 1st stage, 2nd stage, 3rd stage and 4th or higher stage compounds, the values of x and y vary, within the above-mentioned range, not only depending on the reaction temperature and time, but also depending on the crystallinity and c-axial thickness of a graphite material.

The graphite material to be used for the production of a ternary graphite intercalation compound according to the present invention may be any of a natural graphite and a artificial graphite which can be obtained by subjecting petroleum coke or the like to heat treatment. The size of the graphite material is not critical. There may be employed a flaky or powdery graphite having a size of about 20 to 50 meshes or not less than 50 to 400 meshes or more (Tyler). Meanwhile, in case a block-shaped graphite is desired, there may be used a material which can be obtained by a process which comprises contacting a hydrocarbon such as methane, propane, benzene and/or acetylene with a substrate (generally, made of an artificial graphite) heated at approximately 2,100° C. to pyrolyze the hydrocarbon and to deposit the resulting graphite material on the substrate, and subjecting the deposited graphite material to heat treatment. Block-shaped graphites having defferent graphitization degrees are obtained according to the heat-treatment temperature. When the heat treatment is effected at about 2,400° C., there is obtained a pyrolytic carbon. When the heat treatment is effected at about 2,600° C. to 3,000° C., there is obtained a pyrolytic graphite having a high crystallinity as compared with that of a pyrolytic carbon.

With respect to the production of a ternary graphite intercalation compound of the formula $C_xF(AlF_3)_y$ or $C_xF(MgF_2)_y$ by contacting a graphite material with $AlF_3$ or $MgF_2$ in an atmosphere of fluorine gas at a temperature of 0° C. to 400° C. for at least a period of time to effect a weight increase in the graphite, the desirable reaction conditions are as follows. The fluorine pressure is not critical, but may usually be 0.5 to 10 atm. For $C_xF(AlF_3)_y$, the reaction temperature is 0° to 400° C., preferably 15° to 370° C. For $C_xF(MgF_2)_y$, the reaction temperature is 0° to 400° C., preferably 15° to 350° C. As described before, to obtain the composition of the formula $C_xF(AlF_3)_y$ or $C_xF(MgF_2)_y$ having desired values of x and y, the reaction time depends on the crystallinity and c-axial thickness of a graphite material and the reaction temperature. But, the reaction time generally is 1 hour to 10 days and more usually 1 day to 8 days. The weight amount ratio of a graphite material to a metal fluoride, namely, $AlF_3$ or $MgF_2$, depends on the desired stage number of the ternary graphite intercalation compound, but generally 1:0.4 to 1:10. With respect to the reaction conditions, it is noted that when the temperature of the reaction system is elevated to a temperature higher than 100° C., a weight increase in the graphite is observed during the course of cooling of the once heated reaction system at the time when the temperature becomes below 100° C. When the c-axial thickness of a graphite material is more than 1 mm, the product tends to be of the 2nd stage or higher stage rather than of the 1st stage. In order to obtain the 1st stage compound, it is generally preferred to employ a graphite material having a thickness (c-axis direction) of up to 0.8 mm.

After completion of the reaction, if the temperature of the reaction system has been elevated to a temperature higher than room temperature, the reaction system is cooled to room temperature. The metal fluoride, i.e., $AlF_3$ or $MgF_2$ remaining unreacted is separated by means of a sieve or a pincette to obtain the desired ternary graphite intercalation compound of the formula $C_xF(Al_3)_y$ or $C_xF(MgF_2)_y$.

The indentity periods (Ic) of $C_xF(AlF_3)_y$ are 9.4 to 9.5 Å, 12.8 to 12.9 Å, 16.1 to 16.2 Å and 19.5 to 19.6 Å for the 1st, 2nd, 3rd and 4th stage compounds, respectively. The identity periods (Ic) of $C_xF(MgF_2)_y$ are 9.3 to 9.4 Å, 12.7 to 12.8 Å, 16.0 to 16.1 Å and 19.4 to 19.5 Å for the 1st, 2nd, 3rd and 4th stage compounds, respectively. With respect to the ternary graphite intercalation compounds of the formula $C_xF(AlF_3)_y$, the 1st stage compounds are bluish black to black in color, and the 2nd, 3rd and 4th stage compounds are black in color. With respect to the ternary intercalation compounds of the formula $C_xF(MgF_2)_y$, the 1st, 2nd, 3rd and 4th stage compounds are black in color. All the ternary graphite intercalation compounds of the formula $C_xF(AlF_3)_y$ or $C_xF(MgF_2)_y$ according to the present invention are very stable so that, even after exposure to air for several weeks or immersion in water overnight, any changes are not observed in their X-ray diffraction patterns.

The results of elementary analysis and X-ray diffraction of some forms of the present ternary graphite intercalation compounds of the formulae $C_xF(alF_3)_y$ and $C_xF(MgF_2)_y$ are shown in Table 1.

TABLE 1

| Compound | Elementary analysis (%) | X-ray diffraction data (Cu—Kα) | | | |
|---|---|---|---|---|---|
| | | 2θ(°) | d(Å) | (00l) | Ic (Å) |
| $C_8F(AlF_3)_{0.15}$ slightly bluish black | C:75.4 | 9.38 | 9.42 | 001 | |
| | | 18.70 | 4.74 | 002 | 9.44 |
| | F:21.5 | 28.44 | 3.14 | 003 | ±0.04 |
| | | 48.42 | 1.88 | 005 | |
| | Al:3.1 | 58.90 | 1.57 | 006 | |
| $C_6F(AlF_3)_{0.15}$ bluish black | C:69.3 | 9.72 | 9.09 | 001 | |
| | | 18.98 | 4.67 | 002 | 9.40 |
| | F:26.7 | 28.32 | 3.15 | 003 | ±0.06 |
| | | 48.7 | 1.87 | 005 | |
| | Al:4.0 | 59.26 | 1.56 | 006 | |
| $C_{17}F(AlF_3)_{0.45}$ black | C:78.4 | 9.60 | 9.20 | 001 | |
| | | 18.94 | 4.68 | 002 | 9.50 |
| | F:16.9 | 27.80 | 3.21 | 003 | ±0.14 |
| | | 47.4 | 1.92 | 005 | |
| | Al:4.7 | 58.0 | 1.59 | 006 | |
| $C_9F(MgF_2)_{0.08}$ black | C:82.4 | 9.48 | 9.32 | 001 | |
| | | 19.04 | 4.66 | 002 | |
| | F:16.2 | 28.38 | 3.14 | 003 | 9.37 |
| | | 43.38 | 1.88 | 005 | ±0.06 |
| | Mg:1.4 | 59.00 | 1.56 | 006 | |
| $C_2F(MgF_2)_{0.14}$ black | C:75.2 | 9.38 | 9.42 | 001 | |
| | | 18.94 | 4.68 | 002 | |
| | F:21.8 | 28.28 | 3.15 | 003 | 9.41 |
| | | 49.0 | 1.86 | 005 | ±0.05 |
| | Mg:3.0 | 58.90 | 1.57 | 006 | |
| $C_5F(MgF_2)_{0.10}$ black | C:71.3 | 9.50 | 9.30 | 001 | |
| | | 19.10 | 4.64 | 002 | |
| | F:26.0 | 28.48 | 3.13 | 003 | 9.34 |
| | | 42.42 | 2.13 | 100* | ±0.05 |
| | Mg:2.7 | 48.9 | 1.86 | 005 | |
| | | 59.2 | 1.56 | 006 | |

Note
*a peak due to graphite fluoride

Figure 4:
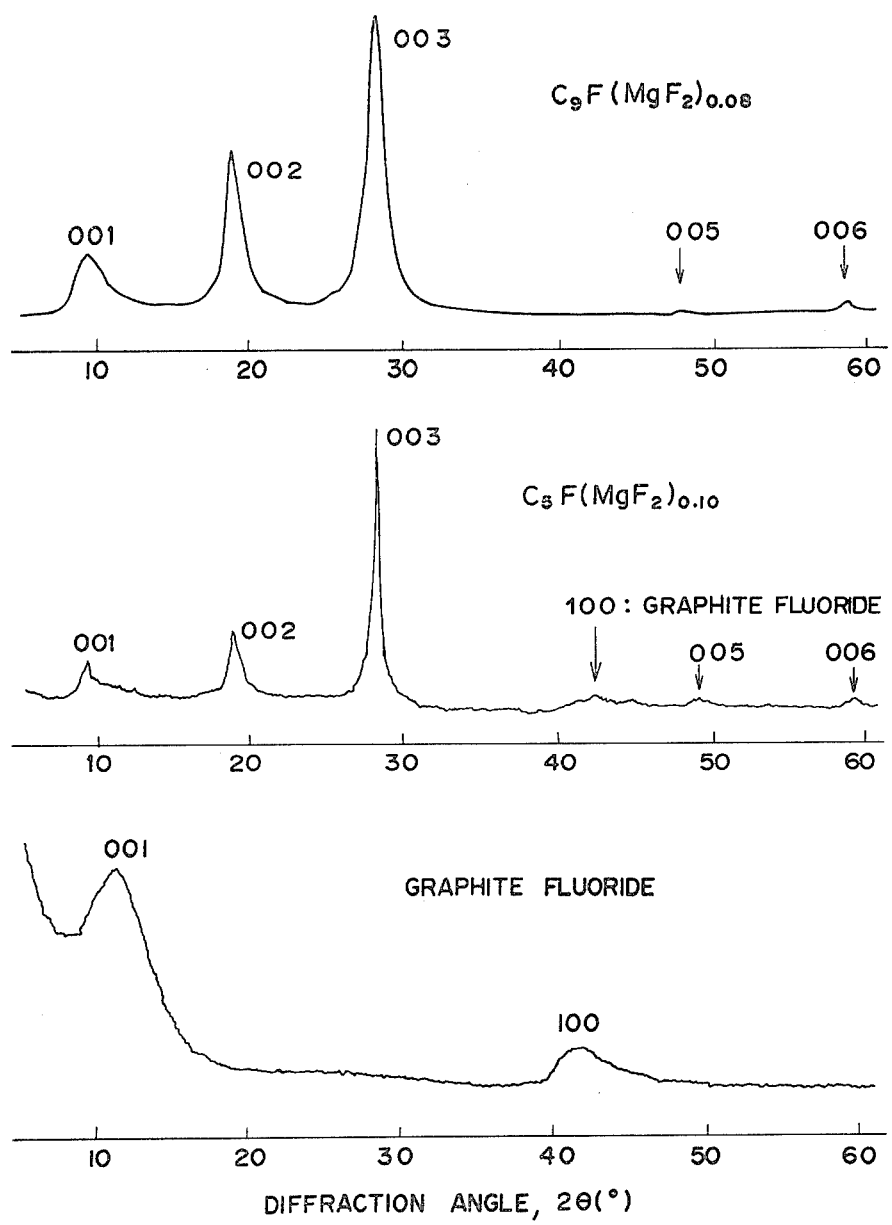
FIG. 4 shows X-ray diffraction patterns of $C_9F(MgF_2)_{0.08}$ and $C_5F(MgF_2)_{0.10}$ which are further forms of ternary graphite intercalation compounds according to the present invention, shown in comparison with that of a graphite fluoride.

Referring to FIGS. 1 and 4, there are illustrated X-ray diffraction patterns (Cu-Kα) of $C_6F(AlF_3)_{0.15}$, $C_9F(MgF_2)_{0.08}$ and $C_5F(MgF_2)_{0.10}$, shown in comparison with that of a graphite fluoride composed of 71% by weight of $(C_2F)_n$ and the balance of $(CF)_n$. In the X-ray study of such ternary graphite intercalation compounds, broad diffraction lines are sometimes observed. The identity periods (Ic) of one kind of $C_xF(AlF_3)_y$ and two kinds of $C_xF(MgF_2)_y$ shown in FIGS. 1 and 4 are calculated from the (00l) diffraction lines to be 9.4 Å, 9.37 Å and 9.34 Å, respectively.

Figure 2:
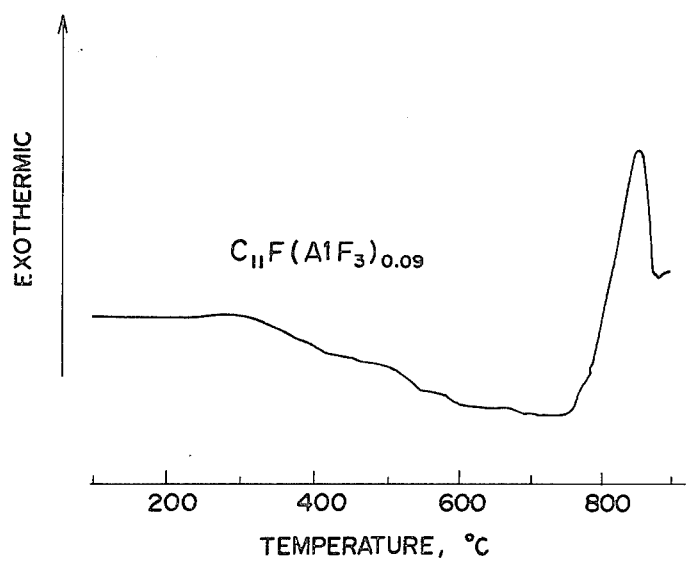
FIG. 2 shows DTA (differential thermal analysis) curve of $C_{11}F(AlF_3)_{0.09}$ which is another form of the ternary graphite intercalation compounds according to the present invention.

In FIG. 2, there is shown DTA curve (as measured in air, with a heating rate of 20° C./min) of $C_{11}F(AlF_3)_{0.09}$. FIG. 5 shows DTA curves (as measured in air, with a heating rate of 20° C./min) of $C_9F(MgF_2)_{0.08}$ and $C_7F(MgF_2)_{0.14}$, shown in comparison with that of a graphite fluoride composed of 59% by weight of $(C_2F)_n$ and the balance of $(CF)_n$. With respect to each of $C_9F(MgF_2)_{0.08}$ and $C_7F(MgF_2)_{0.14}$, the exothermic broad peak first starts at about 90° C. as shown in FIG. 5. The weight decrease is also observed at these points by thermogravimetry. In FIG. 2, the exothermic broad peak for $C_{11}F(AlF_3)_{0.09}$ first starts at about 230° C. In FIG. 5 the peaks around 830° C. are attributed to the oxidative reaction of residual graphite. The graphite fluoride gives two exothermic peaks at 573° C. and 697° C., which correspond to the decomposition of graphite fluoride and oxidation of residual carbon, respectively.

Figure 3:
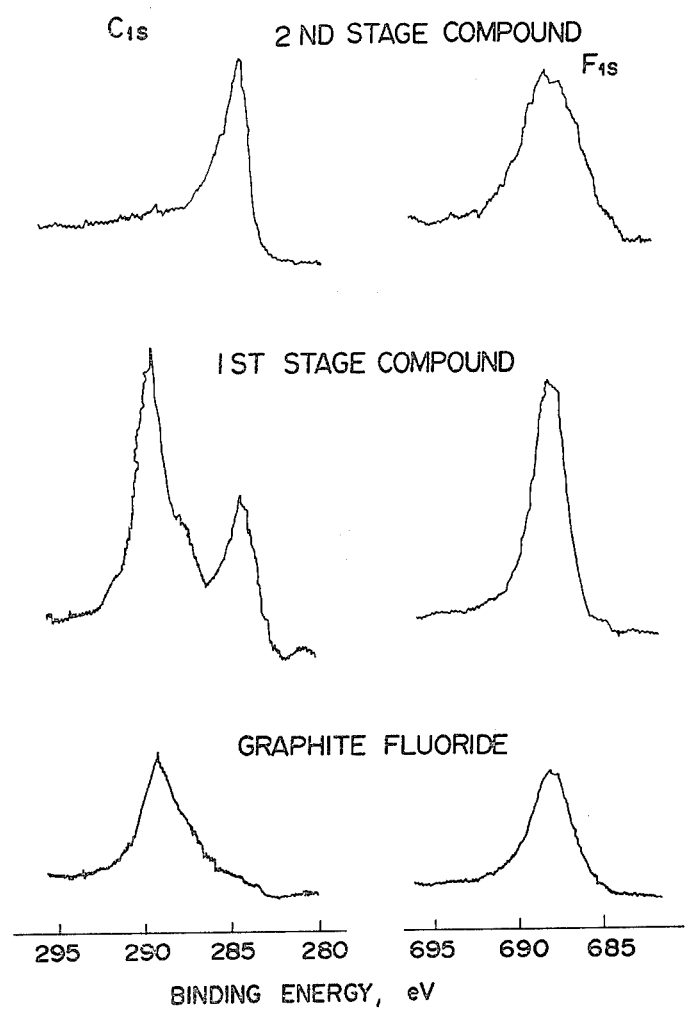
FIG. 3 shows ESCA (electron spectroscopy for chemical analysis) spectra of 1st stage and 2nd stage compounds each containing $AlF_3$ as a metal fluoride according to the present invention, shown in comparison with that of a graphite fluoride.

ESCA is one of the most useful means to give valauable information concerning a chemical bond between the host graphite and the intercalant. In FIG. 3, there are shown ESCA spectra of the 1st stage compound $[C_6F(AlF_3)_{0.15}]$ and the 2nd stage compound of $C_xF(AlF_3)_y$, shown in comparison with that of a graphite fluoride composed of 71% by weight of $(C_2F)_n$ and the balance of $(CF)_n$. A $(C_2F)_n$ type graphite fluoride has two carbon 1s peaks at 289.0 eV and 287.0 eV as compared with contamination carbon 1s peak located at 284.0 eV. The $C_{1s}$ peak at 289.0 eV is attributed to C—F bonds and that appearing at 287.0 eV is attributed to C—C bonds adjacent to C—F bonds. Since a $(CF)_n$ type graphite fluoride has only C—F covalent bonds, the ESCA spectrum has also only one $C_{1s}$ peak at 289.0 eV. The 2nd stage compound shows a strong peak at 284.0 eV and a broad shoulder in the range of 286 eV to 291 eV. The latter suggests the presence of fluorine atoms chemically adsorbed and covalently bonded to carbon atoms of host graphite. The $F_{1s}$ spectrum also gives a rather broad peak at 687.6 eV. $C_{1s}$ peaks for $C_6F(AlF_3)_{0.15}$ are situated at the same positions as those for the graphite fluoride, which indicates that the chemical bond between the host graphite and the intercalated fluorine has nearly covalent nature similar to that for $(C_2F)_n$. In FIG. 6, there are shown ESCA spectra of the 1st stage compounds $[C_7F(MgF_2)_{0.14}$ and $C_5F(MgF_2)_{0.10}]$ and the 2nd stage compound of $C_xF(MgF_2)_y$, shown in comparison with that of a graphite fluoride composed of 59% by weight of $(C_2F)_n$ and the balance of $(CF)_n$. The ESCA spectra shown in FIG. 6 are analogous to those shown in FIG. 3. The 1st stage compound has a strong peak at 289 eV as compared with contamination carbon 1s peak situated at 284 eV. This peak position is almost the same as that for the graphite fluoride, which indicates that the chemical interaction of intercalated fluorine with carbon atom of graphite is similar to that for graphite fluoride with a covalent bond between carbon and fluorine. In addition to the above peak, the 1st stage compound has another strong peak at 284 eV attributed to C—C covalent bond. This means that there are present many carbon atoms having no interaction with fluorine. The 2nd stage compound gives a strong peak at 284 eV for C—C bond and a broad shoulder in the range of 286 eV to 291 eV. In the ESCA study, a kinetic energy of photoelectron emitted from an inner shell of each element is measured. Since the mean free path of photoelectron is at most several ten angstroms in solid materials, only several graphite layers are analysed in graphite intercalation compounds. Accordingly, the chemical bond around the surface of the compound is emphasized in ESCA spectra. Comparison of the peak intensities with the chemical compositions analysed suggests that a small amount of graphite fluoride is formed around the surface of the 1st stage compounds.

With respect to the formation of the ternary graphite intercalation compound of the formual $C_xF(AlF_3)_y$ or $C_xF(MgF_2)_y$, it is believed to be as follows. Gaseous species $(AlF_3)_m \cdot (F_2)_n$ or $(MgF_2)_{m'} \cdot (F_2)_{n'}$ is first formed by the reaction of $AlF_3$ or $MgF_2$ with fluorine according tot he following formula:

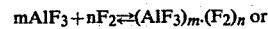

$$mAlF_3 + nF_2 \rightleftarrows (AlF_3)_m \cdot (F_2)_n \text{ or}$$

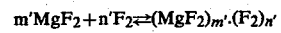

$$m'MgF_2 + n'F_2 \rightleftarrows (MgF_2)_{m'} \cdot (F_2)_{n'}$$

The gaseous species is then intercalated into graphite. Since these chemical equilibriums move to the left with elevation in temperature, gaseous complexes will be decomposed at high o temperatures. The experimental result suggests that $(MgF_2)_{m'} \cdot (F_2)_{n'}$ has higher stability and vapor pressure than $(AlF_3)_m (F_2)_n$ in a wide range of temperature. In addition, $(MgF_2)_{m'} \cdot (F_2)_{n'}$ is expected to have a smaller size than $(AlF_3)_m \cdot (F_2)_n$ because the identity period of $C_xF(MgF_2)_y$ is smaller by about 0.1 Å than that of $C_xF(AlF_3)_y$. It is also known that aluminum halides tend to form a dimer in gas phase. For these reasons, $MgF_2$ and $F_2$ would be more easily intercalated into graphite than $AlF_3$ and $F_2$.

As described before, even after the ternary graphite intercalation compound according to the present invention is exposed to air for several weeks, the analysis of the exposed compound by means of X-ray diffractometry exhibits substantially the same X-ray diffraction pattern as that of the unexposed compound. The ternary graphite intercalation compound according to the present invention is stable to humidity or moisture as different from the conventionally known graphite-fluoride intercalation compounds which decompose immediately when they are exposed to air.

Next, an explanation will be given on the electrical conductivities in the direction of a-axis (parallel to graphite layers) of the ternary graphite intercalation compounds according to the present invention. It is generally known to those skilled in the art that there is substantially no difference in electrical conducitivity between a 2nd stage compound and a 3rd stage compound and that the 2nd stage compound and the 3rd stage compound have excellent electrical conductivity as compare with other stage compounds [see D. Billand, A. Herold and F. Vogel, Synthetic Metals, 3 (1981) 279–288]. A-axis specific resistances were measured of pyrolytic graphite (manufactured and sold by Nippon Carbon Co., Ltd., Japan) and $C_{38}F(MgF_2)_{0.03}$ (mixed stage compound of 1st stage and 2nd stage) according to the 4-point DC-bridge method as described in "Materials Science and Engineering", 31 (1977) 255–259.

The results are shown in Table 2.

TABLE 2

| Compound | Specific resistance, Ω · cm at 25° C. |
|---|---|
| Pyrolytic graphite | $3.5 \times 10^{-5}$ |
| $C_{38}F(MgF_2)_{0.03}$ | $2 \times 10^{-6}$ |

As shown in Table 1, the specific resistance of $C_{38}F(MgF_2)_{0.03}$ is lower than that of the original pyrolytic graphite by one cipher. The ternary graphite intercalation compound according to the present invention has an excellent stability to humidity or moisture but also a high electrical conductivity. The ternary graphite intercalation compound according to the present invention can be sheathed by a copper foil or incorporated into an epoxy resin so that it can be used as an electrically conductive material. The ternary graphite intercalation compound according to the present invention is useful not only as an electrically conductive material but also as a catalyst for various organic reactions.

The present invention will be illustrated in more detail with reference to the following Examples, which should not be construed to be limiting the scope of the present invention.

EXAMPLE 1

In a reaction tube made of a nickel was charged a mixture of 0.3 g of flaky natural graphite having a size of 297 to 840 μm from Madagascar ore and 0.6 g of powdery $AlF_3$, followed by evacuation to vacuum. $F_2$ gas was then introduced into the tube to 1 atm at 25° C. After held at 25° C. for 30 minutes, the reaction system was heated at a temperature elevation rate of about 4° C./min to 350° C., at which the reaction system was kept for 30 hours. The reaction tube was then cooled to 25° C., and the fluorine gas was substituted by nitrogen. The product and $AlF_3$ remaining unreacted were separated by means of a sieve of 297 μm to obtain a bluish black intercalation compound of the formula $C_6F(AlF_3)_{0.15}$.

EXAMPLE 2

In a reaction tube made of a nickel was charged a mixture of 0.3 g of flaky natural graphite having a size of 297 to 840 μm from Madagascar ore and 0.6 g of powdery $MgF_2$, followed by evacuation to vacuum. $F_2$ gas was then introduced into the tube to 1 atm at 25° C. After held at 25° C. for 30 minutes, the reaction system was heated at a temperature elevation rate of about 4° C./min to 300° C., at which the reaction system was kept for 45 hours. The reaction tube was then cooled to 25° C., and the fluorine gas was substituted by nitrogen. The product and $MgF_2$ remaining unreacted were separated by means of sieve of 297 μm to obtain a black intercalation compound of the formula $C_7F(MgF_2)_{0.10}$.

EXAMPLE 3

In a reaction tube made of nickel was charged 0.3 g of flaky natural graphite having a size of 297 to 840 μm from Madagascar ore and 0.6 g of powdery $MgF_2$, followed by evacuation to vacuum. $F_2$ gas was then introduced into the tube to 1 atm at 25° C. The reaction system was heated to 320° C. at a temperature elevation rate of 4° C./min, and kept at 320° C. for 58 hours. The reaction tube was then cooled to 25° C., and the fluorine gas was substituted by nitrogen. The product and $MgF_2$ remaining unreacted were separated by means of a sieve of 297 μm to obtain a black intercalation compound of the formula $C_9F(MgF_2)_{0.08}$.

EXAMPLE 4

In a reaction tube made of nickel was charged 42.9 mg of pyrolytic graphite (product of Nippon Carbon Co., Ltd., Japan) having a c-axial thickness of 0.671 mm, a width of 4.445 mm and a length of 5.012 mm and 100 mg of powdery $MgF_2$, followed by evacuation to vacuum. $F_2$ gas was then introduced into the tube to 1 atm at 25° C. The reaction system was kept at 25° C. for 8 days. The fluorine gas was substituted by nitrogen. The product and $MgF_2$ remaining unreacted were separated by means of a sieve to obtain a black intercalation compound of the formula $C_{11}F(MgF_2)_{0.05}$. The specific resistance of the product was $4 \times 10^{10-6} \Omega.cm$, whereas the specific resistance of the original pyrolytic graphite was $3.5 \times 10^{-5} \Omega.cm$. The product was a 1st stage compound.

EXAMPLE 5

In a reaction tube made of nickel was charged 51.0 mg of pyrolytic graphite (product of Nippon Carbon Co., Ltd., Japan) having a c-axial thickness of 0.928 mm, a width of 4.457 mm and a length of 5.125 mm and 100 mg of powdery $MgF_2$, followed by evacuation to vacuum. The reaction system was heated to 232° C. at a temperature elevation rate of 4° C./min, and $F_2$ gas was then introduced into the tube to 1 atm at 232° C. The reaction system was kept at 232° C. for 8 days. The fluorine gas was substituted by nitrogen. The product and $MgF_2$ remaining unreacted were separated by means of a sieve to obtain a black intercalation compound of the formula $C_{38}F(MgF_2)_{0.03}$. The specific resistance of the product was $2 \times 10^{-6} \Omega.cm$, whereas the specific resistance of the original pyrolytic graphite was $3.5 \times 10^{-5} \Omega.cm$. The product was a mixed stage compound of a 1st stage and a 2nd stage.

EXAMPLE 6

In a reaction tube made of nickel was charged 66.7 mg of pyrolytic graphite (product of Nippon Carbon Co., Ltd., Japan) having a c-axial thickness of 0.950 mm, a width of 5.081 mm and a length of 5.237 mm and 100 mg of powdery $MgF_2$, followed by evacuation to vacuum. $F_2$ gas was then introduced into the tube to 1 atm at 25° C. The reaction system was kept at 25° C. for 2 days. The fluorine gas was substituted by nitrogen. The product and $MgF_2$ remaining unreacted were separated by means of a sieve to obtain a black intercalation compound of the formula $C_{30}F(MgF_2)_{0.19}$. The specific resistance of the product was $2 \times 10^{-6} \Omega.cm$, whereas the speicific resistance of the original pyrolytic graphite was $3.5 \times 10^{-5} \Omega.cm$. The product was a mixed stage compound of a 1st stage, a 2nd stage and a 4th stage.

EXAMPLE 7

In a reaction tube made of nickel was charged 80.4 mg of pyrolytic graphite (product of Nippon Carbon Co., Ltd., Japan) having a c-axial thickness of 0.950 mm, a width of 5.427 mm and a length of 6.175 mm and 100 mg of powdery $MgF_2$, followed by evacuation to vacuum. $F_2$ gas was then introduced into the tube to 1 atm at 25° C. The reaction system was kept at 25° C. for 2 days. The fluorine gas was substituted by nitrogen. The product and $MgF_2$ remaining unreacted were separated by means of a sieve to obtain a black intercalation compound of the formula $C_{32}F(MgF_2)_{0.17}$. The specific resistance of the product was $9 \times 10^{-7} \Omega.cm$, whereas the specific resistance of the original pyrolytic graphite was $3.5 \times 10^{-5} \Omega$. The product was a mixed stage compound of a 1st stage, a 2nd stage and a 4th stage.

In the meantime, the ESCA studies described herein were conducted using a Du Pont 650B Electron Spectrometer with Mg-Kα radiation. The DTA was carried out in air using α-$Al_2O_3$ as a reference. The analysis of Al was made by the atomic absorption method.

It is clearly understood from the above examples that according to the present invention there are provided novel ternary intercalation compounds respectively of the formulae $C_xF(AlF_3)_y$ and $C_xF(MgF_2)_y$ having excellent characteristics and a preparation method thereof. But, further features and advantages of the present invention are apparent from many experimental data given in the detailed description given before.

What is claimed is:

1. A ternary intercalation compound of a graphite with a metal fluoride and fluorine produced by the reaction between a graphite, a metal fluoride and fluorine and which is represented by the formula $C_xF(MF_z)_y$, wherein M is Al or Mg; z is an integer corresponding to the valence of M; and the relative values of x and y are determined by the time and temperature of said reaction between the graphite, the metal fluoride and fluorine and the crystallinity and c-axial thickness of the graphite.

2. A ternary intercalation compound according to claim 1, wherein x is about 3.0 to 50 and y is about 0.0001 to 0.20.

3. A ternary intercalation compound according to claim 1, wherein said ternary intercalation compound of a graphite with a metal fluoride and fluorine is a mixture of stage compounds consisting essentially of at least two different stage compounds selected from the group consisting of a 1st stage compound, a 2nd stage compound, a 3rd stage compound and a 4th stage compound.

4. A process for producing a ternary intercalation compound of a graphite with a metal fluoride and fluorine, which comprises contacting a graphite material with a metal fluoride selected from $AlF_3$ and $MgF_2$ in an atmosphere of fluorine gas at a temperature of 0° C. to 400° C. for at least a period of time to effect a weight increase in the graphite, whereby there is obtained a ternary intercalation compound represented by the formula $C_xF(MF_z)_y$, wherein M is Al or Mg; z is an integer corresponding to the valence of M; and the relative values of x and y are determined by the time and temperature of said reaction between the graphite, the metal fluoride and fluorine and the crystallinity and c-axial thickness of the graphite.

5. A process according to claim 4, wherein x is about 3.0 to 50 and y is about 0.0001 to 0.20.

6. A process according to any one of claims 4 or 5, wherein the graphite material and the metal fluoride are employed in a weight ratio of 1:0.4 to 1:10.

7. A process according to any one of claims 4 or 5, wherein the metal fluoride is $AlF_3$ and the temperature is 15° to 370° C.

8. A process according to any one of claims 4 or 5, wherein the metal fluoride is $MgF_2$ and the temperature is 15° to 350° C.

9. A process according to any one of claims 4 or 5, wherein the atmosphere of fluorine gas has a fluorine pressure of 0.5 to 10 atm.

10. An electrically conductive material which comprises a ternary intercalation compound of a graphite with a metal fluoride and fluorine produced by the reaction between a graphite, a metal fluoride and fluorine and represented by the formula $C_xF(MF_z)_y$, wherein M is Al or Mg; z is an integer corresponding to the valence of M; and the relative values of x and y are determined by the time and temperature of said reaction between the graphite, the metal fluoride and fluorine and the crystallinity and c-axial thickness of the graphite.

11. An electrically conductive material according to claim 10, wherein x is about 3.0 to 50 and y is about 0.0001 to 0.20.

* * * * *